United States Patent
Kunimi et al.

(10) Patent No.: US 11,522,247 B2
(45) Date of Patent: Dec. 6, 2022

(54) BATTERY HOLDING DEVICE AND TIMEPIECE

(71) Applicant: CASIO COMPUTER CO., LTD., Tokyo (JP)

(72) Inventors: Ryoichi Kunimi, Akishima (JP); Sae Uchibayashi, Akishima (JP); Hiroyuki Hosobuchi, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 327 days.

(21) Appl. No.: 16/714,943

(22) Filed: Dec. 16, 2019

(65) Prior Publication Data
US 2020/0194746 A1    Jun. 18, 2020

(30) Foreign Application Priority Data

Dec. 18, 2018    (JP) .............................. JP2018-236215

(51) Int. Cl.
  *G04G 17/08*    (2006.01)
  *G04G 17/06*    (2006.01)
  *H01M 50/216*    (2021.01)

(52) U.S. Cl.
  CPC .......... *H01M 50/216* (2021.01); *G04G 17/06* (2013.01); *G04G 17/08* (2013.01)

(58) Field of Classification Search
  CPC ........ G04G 17/04; G04G 17/06; G04G 17/08; G04G 19/00; G04C 10/00
  See application file for complete search history.

(56) References Cited

U.S. PATENT DOCUMENTS

| | | | | |
|---|---|---|---|---|
| 4,070,821 A | * | 1/1978 | Somogyi ................ | G04C 10/00 368/300 |
| 4,223,521 A | * | 9/1980 | Saitoh .................... | G04C 10/00 968/452 |
| 4,362,396 A | * | 12/1982 | Perrot ................ | H01M 50/216 368/203 |
| 4,407,590 A | * | 10/1983 | Ohno .................... | G04C 10/00 968/452 |
| 4,460,281 A | * | 7/1984 | Othenin-Girard .. | H01M 50/216 968/878 |

(Continued)

FOREIGN PATENT DOCUMENTS

| | | |
|---|---|---|
| GB | 1408610 A | 10/1975 |
| JP | S5389531 U | 7/1978 |

(Continued)

OTHER PUBLICATIONS

First Office Action dated Jan. 17, 2022 received in Chinese Patent Application No. CN 201911303980.1 together with an English language translation.

(Continued)

*Primary Examiner* — Edwin A. Leon
(74) *Attorney, Agent, or Firm* — Scully Scott Murphy & Presser

(57) ABSTRACT

A battery holding device includes a battery holding member and a plate. The plate houses the battery holding member. The battery holding member includes a fastener and a battery holder. The fastener is fixed to the plate. The battery holder holds a battery, and is arranged at a position where the battery holder does not contact the plate.

5 Claims, 6 Drawing Sheets

(56) References Cited

U.S. PATENT DOCUMENTS

| | | | | | |
|---|---|---|---|---|---|
| 4,478,524 | A | * | 10/1984 | Saitoh | G04C 3/008 |
| | | | | | 968/452 |
| 4,763,308 | A | * | 8/1988 | Morata | H01M 50/216 |
| | | | | | 368/204 |
| 6,381,199 | B1 | * | 4/2002 | Kroner | G04G 17/06 |
| | | | | | 368/203 |
| 6,614,725 | B2 | * | 9/2003 | Marquis | G04G 17/06 |
| | | | | | 368/204 |
| 9,063,522 | B2 | * | 6/2015 | Ferri | G04C 10/00 |

FOREIGN PATENT DOCUMENTS

| | | |
|---|---|---|
| JP | S5547680 U | 3/1980 |
| JP | H07-038494 U | 7/1995 |
| JP | 2004-253240 A | 9/2004 |
| JP | 2013108753 A | 6/2013 |
| JP | 2015-179303 A | 10/2015 |
| JP | 2017-181176 A | 10/2017 |

OTHER PUBLICATIONS

Notice of Reasons for Refusal dated Oct. 18, 2022 received in Japanese Patent Application No. JP 2018-236215.

* cited by examiner

BATTERY HOLDING DEVICE AND TIMEPIECE

CROSS-REFERENCE TO RELATED APPLICATIONS

This application is based upon and claims the benefit of priority from the prior Japanese Patent Application No. 2018-236215, filed on Dec. 18, 2018, the entire contents of which are incorporated herein by reference.

BACKGROUND

The technical field relates to a battery holding device and a timepiece.

As disclosed in JP 2017-181176 A, in a device such as a timepiece, a battery that supplies electric power is housed in a battery case.

For example, in a watch, as shown in FIG. 6A and FIG. 6B, a battery case 50 made of resin has a concave battery compartment 50a, and a battery 60 is housed therein. The battery 60 is supported by a bottom plate 50b of the battery case 50 via a cushion 51. Between the bottom plate 50b of the battery case 50 and the battery 60, a terminal plate 52 made of metal is provided. The terminal plate 52 is fixed to the battery case 50 by a screw(s) 54, together with a circuit board 53.

However, in the above conventional structure, because the battery case 50 (bottom plate 50b) made of resin supports the battery 60, the bottom plate 50b needs to be formed to have a thickness equal to or greater than a predetermined value in preparation for an impact applied to the bottom plate 50b via the battery 60. This hinders reduction in thickness of the battery case 50 and size of the device as a whole.

SUMMARY

One or more embodiments disclose a battery holding device and a timepiece.

An embodiment of a battery holding device includes:
a battery holding member that holds a battery; and
a plate that houses the battery holding member, wherein the battery holding member includes:
a fastener that is fixed to the plate; and
a battery holder that holds the battery, and
the battery holder is arranged at a position where the battery holder does not contact the plate.

BRIEF DESCRIPTION OF THE DRAWINGS

The accompanying drawings, which are incorporated is and constitute a part of the specification, illustrate embodiments, and together with the general description given above and the detailed description of the embodiments given below, serve to explain the principles of the present invention, wherein.

DETAILED DESCRIPTION

Hereinafter, an embodiment of a battery holding device and a timepiece will be described with reference to FIG. 1 to FIG. 5B.

In the embodiment described below, a battery holding device is provided in a timepiece as an example. The scope of the present invention is not limited to the following embodiment or illustrated examples.

Figure 1:
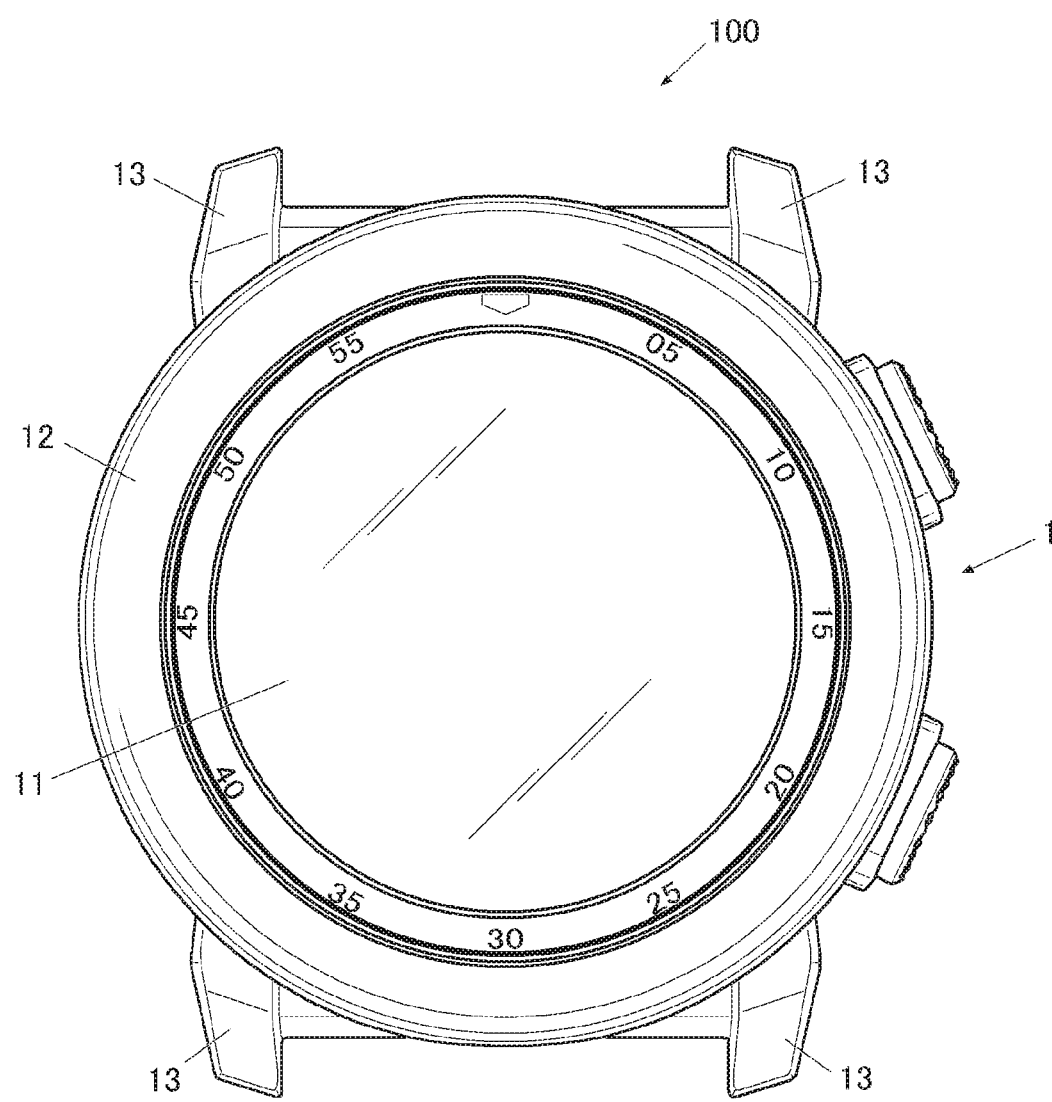
FIG. 1 is a front view of a timepiece according to an embodiment.

FIG. 1 is a front view of a timepiece according to an embodiment.

As shown in FIG. 1, in this embodiment, a timepiece 100 includes a timepiece case 1 and a timepiece module 2 (shown in FIG. 2) arranged in the timepiece case 1.

The timepiece case 1 is not particularly limited, but, in this embodiment, a back-cover-integrated case (so-called one piece case) where only the front surface side (visible side) is open, and the back surface side is closed.

The timepiece case 1 is formed of, for example, synthetic resin, ceramics, glass, or metal. Examples of synthetic resin include: nylon resin, such as Trogamide®; ABS resin; super engineering plastics, such as polyarylate (PAR); and engineering plastics, such as polyacetal (POM) and polycarbonate (PC). Examples of metal include titanium, stainless steel (SUS), and aluminum. The material that forms the timepiece case 1 is not limited to these cited here.

On the front surface side (visible side) of the timepiece case 1, a windshield member 11 made of transparent material, such as clear glass or crystal, is provided so as to cover the opening. The windshield member 11 is attached to the timepiece case 1 via a waterproof ring (not shown) or the like, and closes the opening on the upper side of the timepiece case 1 with airtightness ensured.

On the front surface side of the timepiece case 1, an exterior member 12, such as a bezel, is also provided so as to surround the windshield member 11. The shape or the like of the exterior member 12 is not limited to the illustrated example. The exterior member 12 may not be provided.

On the outer lateral surface of the timepiece case 1, belt attaching parts 13 are provided at around positions of 12 o'clock and 6 o'clock (i.e. both upper and lower ends in FIG. 1) in the timepiece 100. To the belt attaching parts 13, a timepiece belt((s) is attached.

Figure 2:
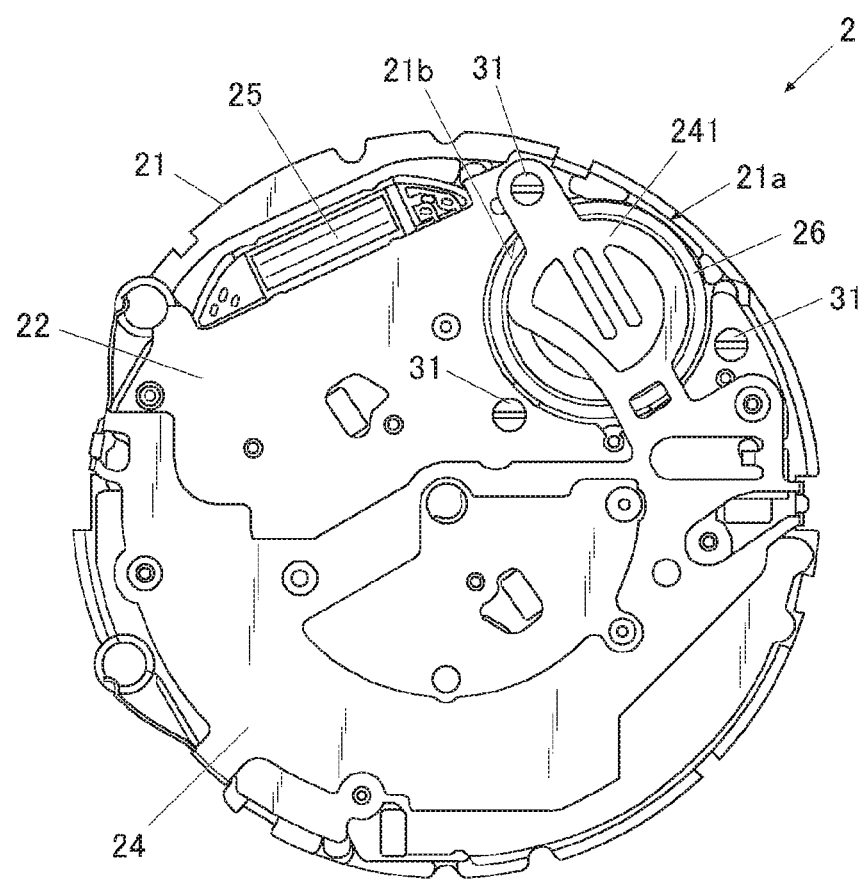
FIG. 2 is a plan view of a timepiece module in the embodiment viewed from the back surface side.

FIG. 2 is a plan view of the timepiece module 2 viewed from the back surface side.

As shown in FIG. 2, the timepiece module 2 is formed by mounting a circuit board 22, a dial (not shown) and so forth on the front and back (upper and lower) sides of a main plate 21 such that they are integrated.

The main plate 21 (plate) is a substantially disk-shaped member formed of relatively hard synthetic resin, such as engineering plastics or super engineering plastics. The main plate 21 is a battery case in this embodiment.

In the timepiece module 2, the circuit board 22 and a circuit pressing member 24 are laid on the back surface side of the main plate 21 in this order.

On the circuit board 22, various circuits and conductive patterns (all not shown) are arranged. The circuit board 22 is directly fixed to the main plate 21 by screws 31 or the like, and held by the circuit pressing member 24 from the back surface side.

The circuit pressing member 24 is formed, for example, by punching and bending a plate made of metal (e.g. stainless steel), and is formed in the shape of a substantially flat plate. The circuit pressing member 24 is fixed to the circuit board 22 and the main plate 21 by screws. As described below, a part of the circuit pressing member 24 is a battery pressing part 241 that presses a battery 26 downward.

Between the back surface of the main plate 21 and the circuit board 22, an antenna device 25, a driving mechanism (not shown), such as a motor, and various other electronic components (not shown) are arranged.

On the back surface of the main plate 21, the battery 26 that supplies electric power to the electronic components including the motor is arranged. The battery 26 in this embodiment is a short cylindrical coin battery.

Figure 3A:
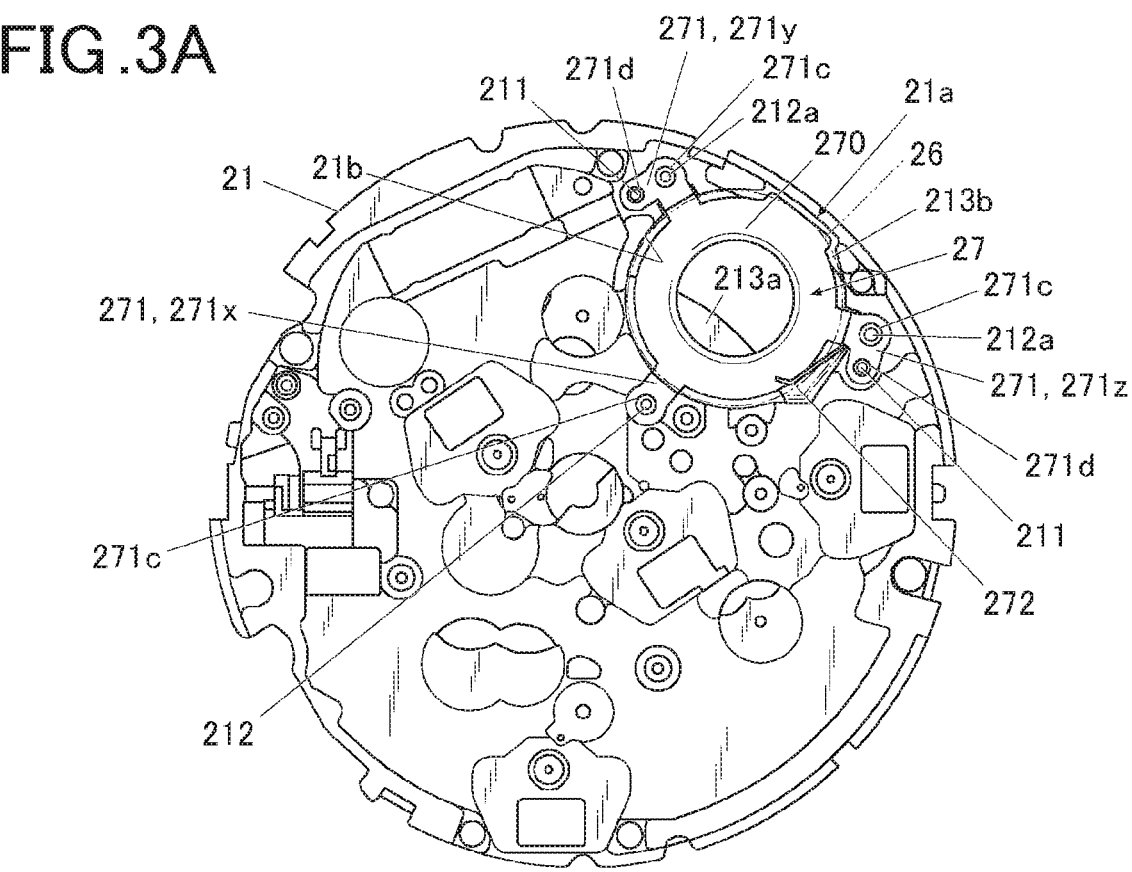
FIG. 3A is a plan view of a main plate and a terminal plate in the embodiment viewed from the back surface side.
Figure 3B:
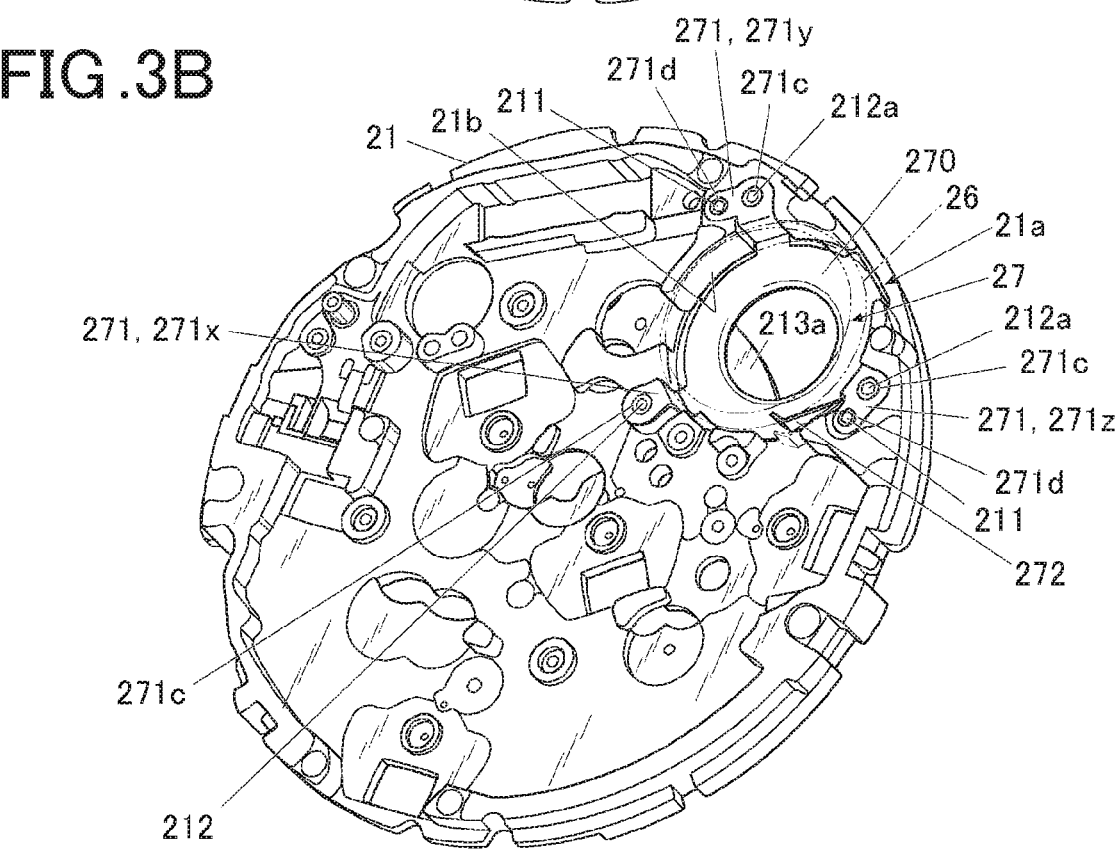
FIG. 3B is a perspective view of the main plate and the terminal plate obliquely viewed from the back surface side.
Figure 4:
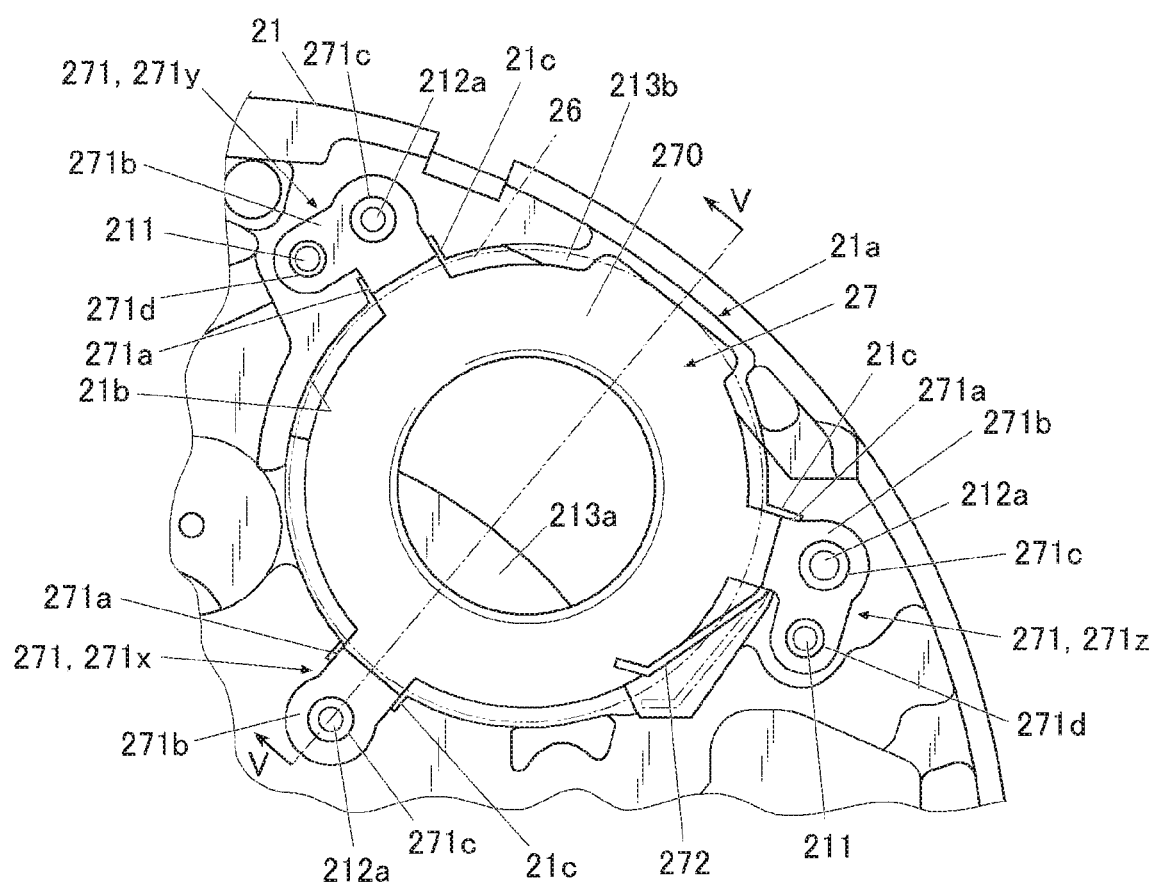
FIG. 4 is an enlarged view of a battery compartment and its surroundings shown in FIG. 3A.

FIG. 3A is a plan view of the main plate 21 and a terminal plate, which is described below, viewed from the back surface side. FIG. 3B is a perspective view of the main plate 21 and the terminal plate obliquely viewed from the back surface side. FIG. 4 is an enlarged view of a battery compartment, which is described below, and its surroundings shown in FIG. 3A.

As shown in FIG. 3A, FIG. 3B, and FIG. 4, a battery compartment 21a having a space corresponding to the battery 26 in shape is provided on the outer circumferential part of the main plate 21, and the battery 26 is housed in the battery compartment 21a. The back surface side of the battery compartment 21a is entirely open, but the front surface side of the battery compartment 21a is partly closed, namely partly open. The end on the front surface side of the battery compartment 21a is partly closed by an inner-side bottom plate 213a and an outer-side bottom plate 213b. The inner-side bottom plate 213a covers a part of the battery compartment 21a close to the center of the main plate 21, and the outer-side bottom plate 231b covers a part of the battery compartment 21a close to the periphery (i.e. outer circumferential part) of the main plate 21.

The battery compartment 21a of the main plate 21 houses a terminal plate 27. The terminal plate 27 is a terminal that electrically contacts the battery 26, and also is a battery holding member that holds the battery 26.

The terminal plate 27 formed, for example, by punching and bending a plate made of metal (e.g. stainless steel). The terminal plate 27 includes a perforated-disk-shaped (i.e. ring-shaped) body 270 (battery holder) and three legs 271 (271x to 271z) arranged at equal intervals on the outer circumferential part (rim part) of the body 270.

The body 270 is formed in the shape of a perforated disk having an outer diameter smaller than that of the battery compartment 21a in a plan view. The body 270 is arranged at the bottom (end on the front surface side) in the battery compartment 21a, and holds the battery 26 housed in the battery compartment 21a from the lower side (front surface side). The body 270 is a terminal part (contact point) that directly contacts the bottom of the battery 26.

Figure 5A:
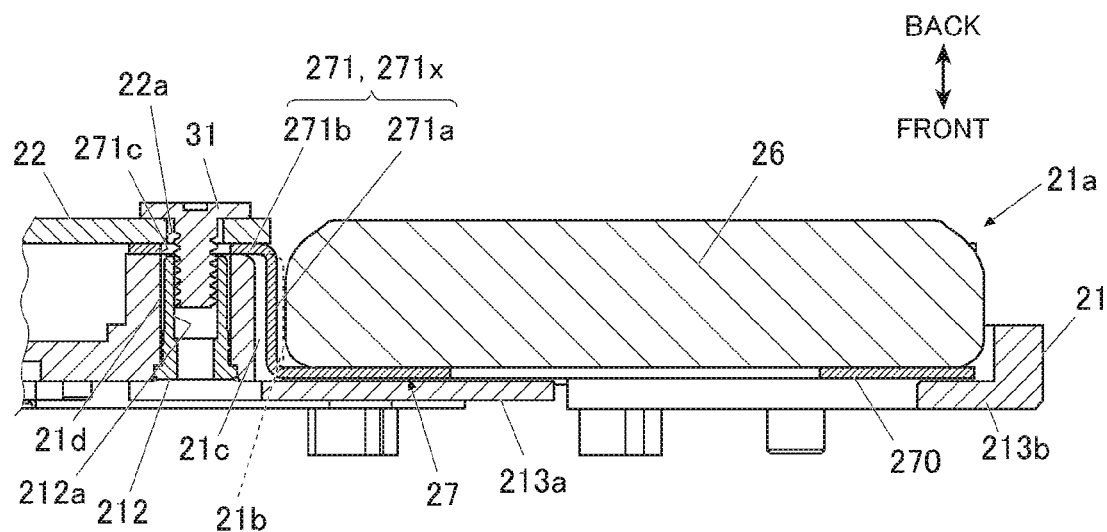
FIG. 5A is a cross-sectional view of the main plate and the terminal plate taken from V-V line in FIG. 4.
Figure 5B:
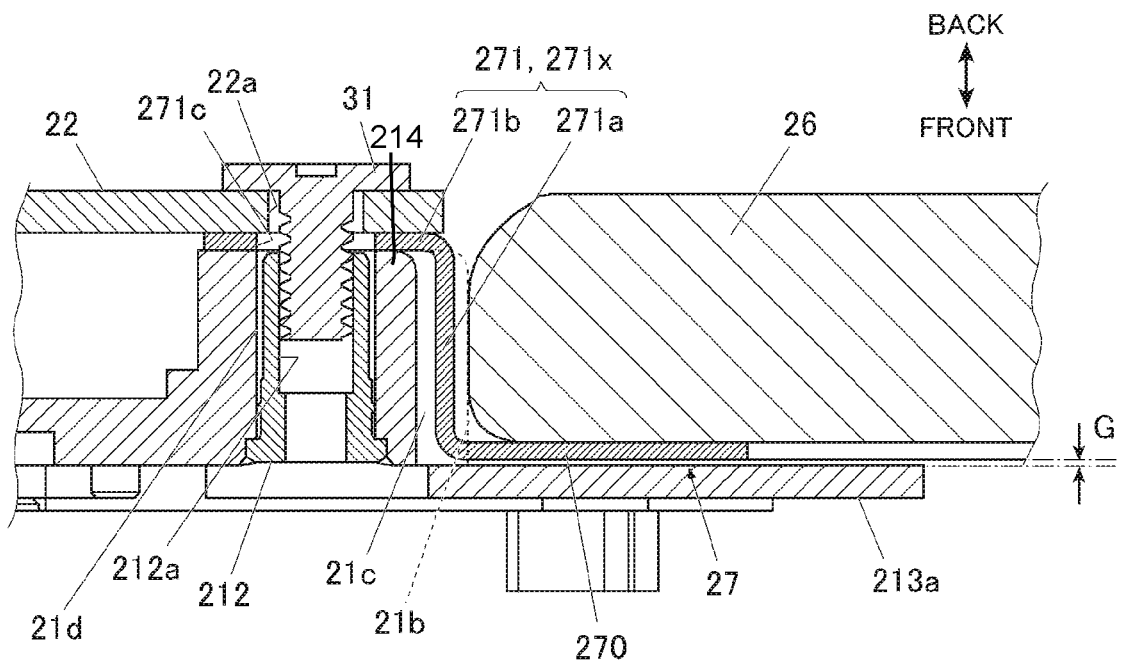
FIG. 5B is an enlarged view of FIG. 5A.
Figure 6A:
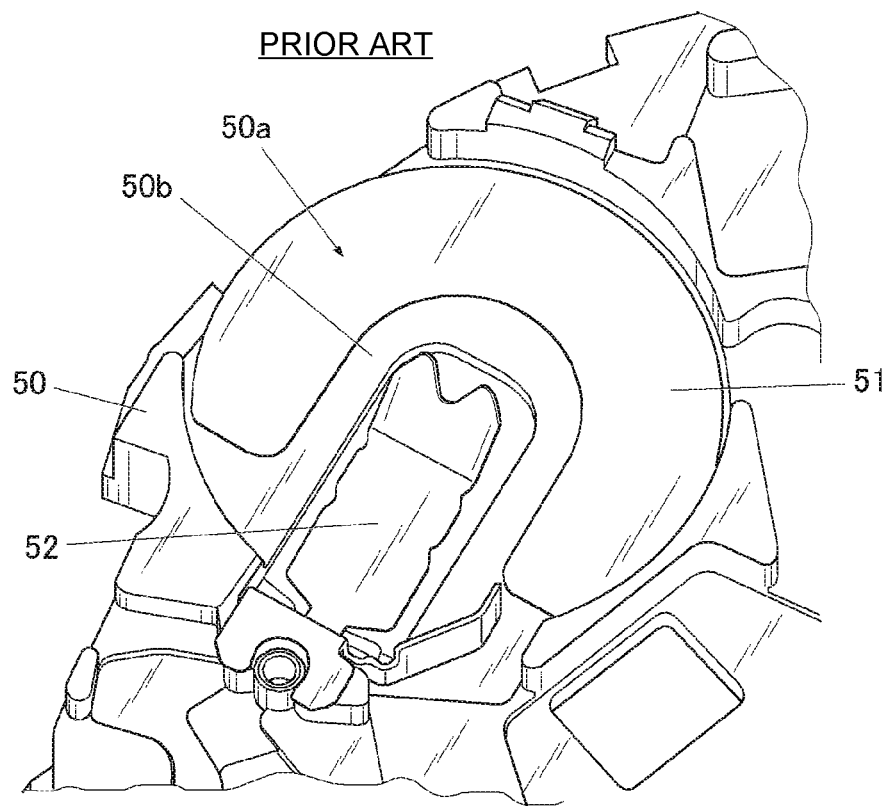
FIG. 6A is an illustration to explain a battery holding structure in a conventional timepiece.
Figure 6B:
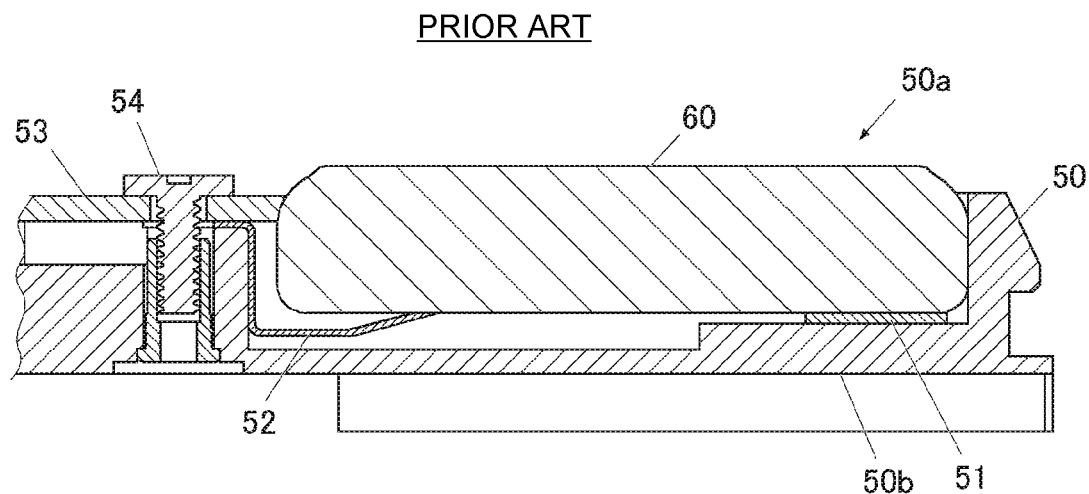
FIG. 6B is another illustration to explain the battery holding structure in the conventional timepiece.

FIG. 5A is a cross-sectional view of the main plate 21 and the terminal plate 27 taken from V-V line in FIG. 4. FIG. 5B is an enlarged view of FIG. 5A. FIG. 5A and FIG. 5B show a state in which the circuit board 22, the fixing screw(s) 31 and so forth are arranged.

As shown in FIG. 4, FIG. 5A, and FIG. 5B, each of the three legs 271 is formed so as to be bent with respect to the body 270, and has: a connector 271a that stands up from the outer circumferential part (rim part) of the body 270 toward the back surface side; and a fastener 271b that protrudes from the top (end on the back surface side) of the connector 271a to the outside of the body 270.

The fastener 271b of each leg 271 is a part that is fixed to a fixing part 214 of the main plate 21, and has a through hole 271c through which the fixing screw 31 is inserted.

Among the three legs 271, two legs 271y, 271z arranged in the circumferential direction of the main plate 21 have the fasteners 271b where positioning holes 271d for positioning the terminal plate 27 with respect to the main plate 21 are formed. The fasteners 271b of the two legs 271y, 271z have parts enlarged in the circumferential direction of the body 270, and these enlarged parts have the positioning holes 271d.

The main plate 21 has positioning pins 211 and screw holes 212a for holding and fixing the fasteners 271b of the terminal plate 27 on and to the main plate 21.

The positioning pins 211 are provided at two points on the back surface of the main plate 21. These two points correspond to the positioning holes 271d of the two legs 271y, 271z of the terminal plate 27. The terminal plate 27 is positioned with respect to the main plate 21 by being arranged on the main plate 21 such that the two positioning pins 211 are inserted through the two positioning holes 271d.

The screw holes 212a are provided at three points on the back surface of the main plate 21. The three points correspond to the through holes 271c of the three legs 271 of the terminal plate 27. At the three points of the main plate 21, through holes 21d that are slightly (e.g. one size) larger than the through holes 271c are formed, and into these through holes 21d, inserts 212 having the screw holes 212a are press-fitted from the front surface side. The screws 31 are inserted from the back surface side into through holes 22a of the circuit board 22, the through holes 271c of the terminal plate 27, and the screw holes 212a of the main plate 21. Thus, the terminal plate 27 is fixed to the circuit board 22 and the main plate 21. A part of the circuit board 22 corresponding to the battery compartment 21a is open, and hence exposes the battery 26 (battery compartment 21a) at the part to the back surface side in the state in which the circuit board 22 is fixed to the main plate 21. The circuit pressing member 24 arranged on the upper side (back surface side) of the circuit board 22 has the battery pressing part 241 extending over the upper side of the battery 26. An end of the battery pressing part 241 is fixed to the leg 271y by the screw 31 with the circuit board 22 in between. Thus, the battery 26 is pressed from the upper side (shown in FIG. 2).

If the screws 31 used are made of metal, and these screws 31, which contact the pole on the back surface side of the circuit board 22, come into contact with the terminal plate 27, the circuit board 22 and the terminal plate 27 are short-circuited. To avoid this, in this embodiment, the terminal plate 27 is arranged and positioned such that the centers of the through holes 271c of the fasteners 271b coincide with the centers of the screw holes 212a of the main plate 21 in the insertion direction of the screws 31, and the through holes 271c of the fasteners 271b are formed so as to be slightly (e.g. one size) larger than the screw holes 212a of the main plate 21. Consequently, the screws 31 do not contact the terminal plate 27 (fasteners 271b). As long as the screws 31 do not contact the terminal plate 27 (fasteners 271b), the size of the through holes 271c of the fasteners 271b is changeable. Further, as long as the screws 31 do not contact the terminal plate 27 (fasteners 271b), arrangement of the through holes 271c of the fasteners 271b and the screw holes 212a of the main plate 21 not limited to the above example.

Among the three legs 271, one leg 271z (on the right side in FIG. 4) has the connector 271a provided with a plate-spring-like pushing part 272 for pushing (i.e. pressing) and fixing the battery 26. The pushing part 272 extends from a side end of the connector 271a in the circumferential direction of the body 270, and is formed in a shape in which the tip is bent toward the inner circumferential part of the body 270. The pushing part 272 pushes the lateral surface of the battery 26 with its own elastic force, thereby pushing the battery 26 against, of a circumferential wall 21b (wall) of the battery compartment 21a, a part opposite to the pushing part 272, and fixing the battery 26 at the position.

In the state in which the terminal plate 27 is fixed to the main plate 21, the connectors 271a of the three legs 271 are arranged in recesses 21c that are recessed into the circumferential wall 21b of the battery compartment 21a. The connectors 271a are arranged in the recesses 21c so as not to contact either the main plate 21 or the battery 26.

In the state in which the terminal plate 27 is fixed to the main plate 21, the body 270 is arranged, as described above, at the end on the front surface side in the battery compartment 21a and holds the battery 26.

In this state, the body 270 leaves a space (gap) G from the inner-side bottom plate 213a and the outer-side bottom plate 213b (in FIG. 5B, only the inner-side bottom plate 213a is shown), which are located on the front surface side of the battery compartment 21a, and does not contact the main plate 21. This can prevent, even if an impact is applied to the battery 26 from the upper side (back surface side), the impact from being directly transmitted to the main plate 21. The size of the space G is not particularly limited, and can be appropriately set according to, for example, the thickness of the main plate 21 and expected magnitude of the impact. In the space G (i.e. on the upper surfaces of the inner-side bottom plate 213a and the outer-side bottom plate 213b), a cushion(s) may be provided.

As described above, according to this embodiment, the terminal plate 27 includes: the fasteners 271b that are fixed to the main plate 21; and the body 270 that holds the battery 26, and the body 270 is arranged at a position where the body 270 does not contact the main plate 21.

This can prevent, even if an impact is applied to the battery 26 from the upper side (back surface side), the impact from being directly transmitted to the main plate 21. Hence, a part (inner bottom plate 213a and outer bottom plate 213b) of the main plate 21, the part being arranged on the lower side (front surface side) of the battery 26, can be made thinner than the conventional one or removed.

Consequently, the device as a whole can be smaller while properly holding the battery 26.

Also, the terminal late 27 holding the battery 26 eliminates need to separately provide a member that holds (supports) a battery and a terminal plate. This can reduce the number of components and hence make the device even smaller.

Further, the terminal plate 27, which holds the battery 26, is made of metal having higher strength than resin. This can make the device even thinner and smaller.

Further, the connectors 271a that connect the fasteners 271b, which are fixed to the main plate 21, to the body 270 are arranged in the recesses 21c that are recessed into the circumferential wall 21b of the battery compartment 21a so as not to contact the main plate 21.

That is, of the terminal plate 27, only the fasteners 271b contact the main plate 21, and the other parts (body 270 and connectors 271a) do not contact the main plate 21. This can more certainly prevent the impact, which is applied to the battery 26 from the upper side (back surface side), from being transmitted to the main plate 21.

Embodiments to which the present invention is applicable are not limited to the above embodiment, and the present invention can be appropriately modified within the scope of the present invention.

For example, although in the above embodiment, the bottom of the battery compartment 21a of the main plate 21 is partly closed by the inner-side bottom plate 213a and the outer-side bottom plate 213b, the bottom of the battery compartment 21a may be entirely open or closed.

Further, although in the above embodiment, the terminal plate 27 has three legs 271, the number of legs 271 may be two, or four or more. Even if there is one leg 271, the present invention can be realized by making its positioning hole 271d long, thereby compensating for decrease in positioning accuracy due to decrease in the number of positioning holes 271d.

Further, although in the above embodiment, the terminal plate 27 is used as the battery holding member, a battery holding member dedicated to battery holding may be provided separately from the terminal plate 27. The battery holding member in this case needs to have at least the same/similar components as/to the fasteners 271b and the body 270 in the above embodiment.

Further, although in the above embodiment, the battery compartment 21a and the terminal plate 27 (body 270) are circular, they can be any shape, for example, rectangular, as long as their shapes fit the battery shape.

Further, although in the above embodiment, the battery 26 is a coin battery, the battery for the present invention is not limited to a coin battery. Besides, the battery for the present invention is not limited to a primary battery and may be a secondary battery.

Further, although in the above embodiment, the battery holding device of the present invention is provided in a timepiece, the battery holding device of the present invention is widely applicable to various devices and structures that each hold a battery.

Although one or more embodiments have been described, the scope of the present invention is not limited to the embodiments and includes the scope of claims below and the scope of their equivalents.

What is claimed is:

1. A battery holding device comprising:
   a battery compartment that houses a battery and includes a plate and a battery holding member,
   wherein the plate includes:
      a fixing part that fixes the battery holding member; and
      a bottom plate,
   the battery holding member includes:
      a fixed part that is fixed to the plate; and
      a battery holder that is plate-like, and
   the battery holder is arranged so as to be substantially parallel to the bottom plate of the plate, and
      a space having a substantially uniform height is provided between the bottom plate of the plate and the battery holder.

2. The battery holding device according to claim 1, wherein the battery holding member is a terminal plate made of metal.

3. The battery holding device according to claim 1, wherein the battery holder is arranged at a bottom in the battery compartment, the fixed part is:
provided with a connector that is provided on a rim part of the battery holder so as to be bent with respect to the battery holder;
connected to the battery holder via the connector; and
fixed to the fixing part on an upper surface of the plate around the battery compartment, and the connector is arranged in a recess that is recessed into a wall of the battery compartment so as not to contact the plate.

4. A timepiece comprising:
the battery holding device according to claim 1; and
a timepiece case that houses the battery holding device.

5. The battery holding device according to claim 1, wherein the battery holder is formed in a shape of a substantially flat perforated disk.

* * * * *